(12) United States Patent
Hara

(10) Patent No.: US 10,005,520 B2
(45) Date of Patent: Jun. 26, 2018

(54) BICYCLE DRIVING SYSTEM AND A MULTIPLE REAR SPROCKET ASSEMBLY THEREOF

(71) Applicant: Shimano Inc., Sakai, Osaka (JP)

(72) Inventor: Nobukatsu Hara, Osaka (JP)

(73) Assignee: SHIMANO INC., Sakai, Osaka ( * ) Notice: Subject to any disclaimer, the term of this patent is extended or adjusted under 35 U.S.C. 154(b) by 182 days.

(21) Appl. No.: 15/042,152

(22) Filed: Feb. 12, 2016

(65) Prior Publication Data

US 2017/0233037 A1    Aug. 17, 2017

(51) Int. Cl.
| | |
|---|---|
| *B62M 9/14* | (2006.01) |
| *B62M 9/10* | (2006.01) |
| *B60B 27/04* | (2006.01) |
| *B60B 27/02* | (2006.01) |
| *B62K 3/00* | (2006.01) |
| *B62M 1/36* | (2013.01) |

(52) U.S. Cl.
CPC ............. *B62M 9/14* (2013.01); *B60B 27/023* (2013.01); *B60B 27/04* (2013.01); *B62M 9/10* (2013.01); *B62K 3/00* (2013.01); *B62M 1/36* (2013.01)

(58) Field of Classification Search
CPC .. B62M 9/14; B62M 9/10; B62M 1/36; B60B 27/04; B60B 27/023; B62K 3/00
USPC ....................................................... 74/594.2
See application file for complete search history.

(56) References Cited

U.S. PATENT DOCUMENTS

| 6,173,982 B1 | 1/2001 | Westergard | |
|---|---|---|---|
| 9,855,794 B1 * | 1/2018 | Nakajima | ............... B60B 27/04 |
| 2006/0258499 A1 * | 11/2006 | Kamada | ................... B62M 9/10 |
| | | | 474/160 |
| 2008/0188336 A1 * | 8/2008 | Tokuyama | ............... B62M 9/10 |
| | | | 474/160 |
| 2011/0092327 A1 * | 4/2011 | Oishi | ....................... B62M 9/10 |
| | | | 474/160 |
| 2012/0225745 A1 * | 9/2012 | Oishi | ....................... B62M 9/10 |
| | | | 474/160 |
| 2013/0008282 A1 | 1/2013 | Johnson et al. | |
| 2013/0035183 A1 * | 2/2013 | Tokuyama | ............... B62M 9/10 |
| | | | 474/78 |
| 2015/0080160 A1 * | 3/2015 | Staples | ..................... B62M 9/10 |
| | | | 474/160 |
| 2016/0167737 A1 * | 6/2016 | Tokuyama | ............... B62M 9/10 |
| | | | 474/160 |
| 2016/0272002 A1 * | 9/2016 | Earle | ..................... B60B 27/047 |
| 2016/0280326 A1 * | 9/2016 | Braedt | ................ B25B 27/0071 |

FOREIGN PATENT DOCUMENTS

FR    2881199 A1    7/2006

* cited by examiner

*Primary Examiner* — William E Dondero
*Assistant Examiner* — Robert T Reese
(74) *Attorney, Agent, or Firm* — Shinyu Global IP

(57) ABSTRACT

A bicycle driving system includes a crank assembly and a multiple rear sprocket assembly. The crank assembly includes a front sprocket including a rotational center axis and a crank arm. The front sprocket is movable relative to the crank arm in an axial direction parallel to the rotational center axis. The multiple rear sprocket assembly includes eleven or more rear sprockets.

19 Claims, 8 Drawing Sheets

BICYCLE DRIVING SYSTEM AND A MULTIPLE REAR SPROCKET ASSEMBLY THEREOF

BACKGROUND

Technical Field

The technology disclosed herein relates to a bicycle driving system and a multiple rear sprocket assembly.

Background Information

In a conventional bicycle, a driving system includes a crank assembly and a rear sprocket assembly.

Currently, the conventional rear sprocket assembly includes rear sprockets less than or equal to eleven. The front sprocket drives the rear sprocket assembly via a bicycle chain.

In the configuration of the above driving system, a range of a drive ratio between the front sprocket and the rear sprockets may be sometime insufficient in the case of the rear sprocket assembly including less than or equal to ten rear sprockets.

Also, the length of the rear sprocket assembly (including the rear sprockets) becomes longer than the conventional one in the axial direction if the rear sprocket assembly is designed to include more than or equal to eleven rear sprockets in order that a range of a drive ratio becomes wider. Inclination of the bicycle chain between the crank assembly and the rear sprocket assembly becomes too much when the bicycle chain engages with a largest rear sprocket or a smallest rear sprocket if the axial length of the rear sprocket assembly becomes longer. Such too much inclination of the bicycle chain between the crank assembly and the rear sprocket assembly results in impairing driving efficiency of the driving system.

In consideration of the problem, it is an object of the present invention to provide a bicycle driving system that has a sufficiently wide range of a gear ratio without impairing driving efficiency of the driving system.

SUMMARY

In accordance with a first aspect of the present invention, a bicycle driving system comprises a crank assembly and a multiple rear sprocket assembly. The crank assembly includes a front sprocket and a crank arm. The front sprocket includes a rotational center axis. The front sprocket is movable relative to the crank arm in an axial direction parallel to the rotational center axis. The multiple rear sprocket assembly includes eleven or more rear sprockets.

With the bicycle driving system according to the first aspect, the front sprocket is movable relative to the crank arm in the axial direction. Therefore, inclination of the bicycle chain between the crank assembly and the rear sprocket assembly is effectively minimized even if the multiple rear sprocket assembly includes eleven or more rear sprockets. Accordingly, it is possible to provide a bicycle driving system that has a sufficiently wide range of a drive ration (i.e. a gear ratio) without impairing driving efficiency of the driving system.

In accordance with a second aspect of the present invention, the bicycle driving system according to the first aspect may be configured as follows. The multiple rear sprocket assembly includes thirteen rear sprockets. Herewith, the bicycle driving system can have a sufficiently wide range of a drive ratio without impairing driving efficiency of the driving system.

In accordance with a third aspect of the present invention, the bicycle driving system according to the first or second aspect may be configured as follows. A drive ratio between the front sprocket and the multiple rear sprocket assembly remains greater than or equal to 0.74 and less than or equal to 3.40. Accordingly, the bicycle driving system can provide a rider with a sufficiently wide range of a drive ratio without impairing driving efficiency of the driving system.

In accordance with a fourth aspect of the present invention, the bicycle driving system according to any one of the first to third aspects may be configured as follows. The front sprocket is a solitary front sprocket. Accordingly, the bicycle driving system can provide a rider with a sufficiently wide range of a drive ratio without impairing driving efficiency of the driving system even if the front sprocket is a solitary front sprocket. Further, the bicycle driving system has an advantage of weight saving resulting from only one front sprocket and no front derailleur.

In accordance with a fifth aspect of the present invention, the bicycle driving system according to any one of the first to fourth aspects may be configured as follows. During operation, the front sprocket moves in the axial direction in accordance with a bicycle chain connecting the front sprocket and one of the eleven or more rear sprockets. Therefore, undesirable inclination of the bicycle chain between the crank assembly and the rear sprocket assembly is effectively prevented. Accordingly, the bicycle driving system can provide a rider with a sufficiently wide range of a drive ratio without impairing driving efficiency of the driving system.

In accordance with a sixth aspect of the present invention, the bicycle driving system according to any one of the first to fifth aspects may be configured as follows. A tooth number of a smallest rear sprocket of the multiple rear sprocket assembly is equal to or less than eleven. A tooth number of a largest rear sprocket of the multiple rear sprocket assembly is equal to or more than thirty-five. Accordingly, the bicycle driving system can provide a rider with a sufficiently wide range of a drive ratio without impairing driving efficiency of the driving system.

In accordance with a seventh aspect of the present invention, the bicycle driving system according to any one of the first to sixth aspects may be configured as follows. A tooth number of the smallest rear sprocket is ten. A tooth number of the largest rear sprocket is forty-six. Accordingly, the bicycle driving system can provide a rider with a sufficiently wide range of a drive ratio without impairing driving efficiency of the driving system.

In accordance with an eighth aspect of the present invention, the bicycle driving system according to any one of the first to seventh aspects may be configured as follows. More than or equal to six rear sprockets are positioned axially inwardly from the front sprocket in a state where the bicycle driving system is mounted to a bicycle the front sprocket is positioned at an axially center position in a sliding range. Accordingly, the rear sprockets can be configured so that the rear sprocket assembly does not too much protrude axially outwardly in the bicycle driving system. In other words, the rear sprocket assembly can be configured to have low profile.

In accordance with a ninth aspect of the present invention, the bicycle driving system according to any one of the first to eighth aspects may be configured as follows. The bicycle driving system further comprises an axially center plane. The axially center plane is perpendicular to the rotational center axis and passes through an axially center position in the sliding range. More than or equal to six rear sprockets are positioned axially inwardly from the axially center plane. Accordingly, the rear sprockets can be configured so that the rear sprocket assembly does not too much protrude axially outwardly in the bicycle driving system. In other words, the rear sprocket assembly can be configured to have low profile.

In accordance with a tenth aspect of the present invention, the bicycle driving system according to the first to eighth aspects may be configured as follows. More than or equal to eight rear sprockets are positioned axially inwardly from the front sprocket. Accordingly, the rear sprockets can be configured so that the rear sprocket assembly does not too much protrude axially outwardly in the bicycle driving system. In other words, the rear sprocket assembly can be configured to have low profile.

In accordance with an eleventh aspect of the present invention, the bicycle driving system according to the first to tenth aspects may be configured as follows. More than or equal to eight rear sprockets are positioned axially inwardly from the axially center plane. Accordingly, the rear sprockets can be configured so that the rear sprocket assembly does not too much protrude axially outwardly in the bicycle driving system. In other words, the rear sprocket assembly can be configured to have low profile.

In accordance with a twelfth aspect of the present invention, a multiple rear sprocket assembly includes a rotational center axis. The multiple rear sprocket assembly comprises first to thirteenth rear sprockets.

The first rear sprocket includes a first tooth number. The second rear sprocket includes a second tooth number that is larger than the first tooth number. The third rear sprocket includes a third tooth number that is larger than the second tooth number. The fourth rear sprocket includes a fourth tooth number that is larger than the third tooth number. The fifth rear sprocket includes a fifth tooth number that is larger than the fourth tooth number. The sixth rear sprocket includes a sixth tooth number that is larger than the fifth tooth number.

The seventh rear sprocket includes a seventh tooth number that is larger than the sixth tooth number. The eighth rear sprocket includes an eighth tooth number that is larger than the seventh tooth number. The ninth rear sprocket includes a ninth tooth number that is larger than the eighth tooth number. The tenth rear sprocket includes a tenth tooth number that is larger than the ninth tooth number. The eleventh rear sprocket includes an eleventh tooth number that is larger than the tenth tooth number. The twelfth rear sprocket includes a twelfth tooth number that is larger than the eleventh tooth number. The thirteenth rear sprocket includes a thirteenth tooth number that is larger than the twelfth tooth number.

The first rear sprocket includes a larger sprocket facing surface and an axially external surface. The larger sprocket facing surface faces the second sprocket in an axial direction parallel to the rotational center axis. The axially external surface is opposite to the larger sprocket facing surface in the axial direction.

The multiple sprocket assembly includes an axial abutment surface. The axial abutment surface is configured to axially abut against a bicycle hub assembly in a state where the multiple rear sprocket assembly is mounted to the bicycle hub assembly.

A first axial distance is larger than or equal to 41.0 mm and smaller than or equal to 42.0 mm in the state. The first axial distance is defined between the axially external surface of the first sprocket and the axial abutment surface in the axial direction.

Accordingly, the multiple rear sprocket assembly can provide a rider with a sufficiently wide range of a drive ratio and enables to be mounted to a standard bicycle frame.

In accordance with a thirteenth aspect of the present invention, the multiple rear sprocket assembly according to the twelfth aspect may be configured as follows. The first axial distance is greater than or equal to 41.50 mm and less than or equal to 41.60 mm. Accordingly, the multiple rear sprocket assembly can provide a rider with a sufficiently wide range of a drive ratio and enables to be mounted to a standard bicycle frame.

In accordance with a fourteenth aspect of the present invention, the multiple rear sprocket assembly according to the twelfth or thirteenth aspect may be configured as follows. The thirteenth sprocket includes a smaller sprocket facing surface and an axially internal surface. The smaller sprocket facing surface faces the twelfth sprocket in the axial direction. The axially internal surface is opposite to the smaller sprocket facing surface in the axial direction.

A second axial distance is larger than or equal to 47.00 mm and smaller than or equal to 48.00 mm in a state where the multiple sprocket assembly is mounted to the bicycle hub assembly. The second axial distance is defined between the axially external surface of the first sprocket and the axially internal surface of the thirteenth sprocket. Accordingly, the multiple rear sprocket assembly can provide a rider with a sufficiently wide range of a drive ratio and enables to be mounted to a standard bicycle frame.

In accordance with a fifteenth aspect of the present invention, the multiple rear sprocket assembly according to any one of the twelfth to fourteenth aspects may be configured as follows. Any one of the first to thirteenth rear sprockets is configured to be connected to a solitary front sprocket via a bicycle chain. Accordingly, the multiple rear sprocket assembly can provide a rider with a sufficiently wide range of a drive ratio. Further, the bicycle driving system comprising the multiple rear sprocket assembly and the solitary front sprocket has an advantage of weight saving resulting from only one front sprocket and no front derailleur.

In accordance with sixteenth aspect of the present invention, the multiple rear sprocket assembly according to any one of the twelfth to fifteenth aspects may be configured as follows. A tooth number of the first rear sprocket is equal to or less than eleven. A tooth number of the thirteenth rear sprocket is equal to or more than thirty-five. Accordingly, the multiple rear sprocket assembly can provide a rider with a sufficiently wide range of a drive ratio.

In accordance with a seventeenth aspect of the present invention, the multiple rear sprocket assembly according to the twelfth to sixteenth aspects may be configured as follows. A tooth number of the first rear sprocket is ten. A tooth number of the thirteenth rear sprocket is forty-six. Accordingly, the multiple rear sprocket assembly can provide a rider with a sufficiently wide range of a drive ratio.

In accordance with a eighteenth aspect of the present invention, the multiple rear sprocket assembly according to any one of the twelfth to seventeenth aspects may be configured as follows. Each rear sprocket includes an axial centerline perpendicular to the rotational center axis. An axial rear sprocket distance is greater than or equal to 3.75 mm and less than or equal to 3.90 mm. The axial rear sprocket distance is defined between axial centerlines of adjacent rear sprockets. Accordingly, the multiple rear sprocket assembly can provide a rider with a sufficiently wide range of a drive ratio.

In accordance with a nineteenth aspect of the present invention, the multiple rear sprocket assembly according to the twelfth to eighteenth aspects may be configured as follows. The first rear sprocket includes a first axial centerline perpendicular to the rotational center axis. The second rear sprocket includes a second axial centerline perpendicular to the rotational center axis. The third rear sprocket includes a third axial centerline perpendicular to the rotational center axis. A first rear sprocket distance is defined between the first axial center line and the second axial center line. A second rear sprocket distance is defined between the second axial center line and the third axial center line. The first rear sprocket distance can be different from the second rear sprocket distance whereas the first rear sprocket distance can also be equal to the second rear sprocket distance. Specifically, the first rear sprocket distance can be larger than the second rear sprocket distance.

The first rear sprocket distance is greater than or equal to 3.85 mm and less than or equal to 3.90 mm.

The second rear sprocket distance is greater than or equal to 3.75 mm and less than or equal to 3.80 mm. The rear sprocket assembly can provide an advantage of a smooth shifting operation between the first rear sprocket and the second rear sprocket and between the second rear sprocket and the third rear sprocket.

In accordance with a twentieth aspect of the present invention, the multiple rear sprocket assembly according to the twelfth to nineteenth aspects may be configured as follows. Each rear sprocket includes an axial width extending in the axial direction. The axial width of each rear sprocket is greater than or equal to 1.50 mm and less than or equal to 1.70 mm. Herewith, the rear sprocket assembly can be compact in an axial direction, and enables to be mounted to a standard bicycle frame.

BRIEF DESCRIPTION OF THE DRAWINGS

Referring now to the attached drawings, which form a part of this original disclosure.

DETAILED DESCRIPTION OF PREFERRED EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

Embodiment

<General Configuration of a Bicycle>

Figure 1:
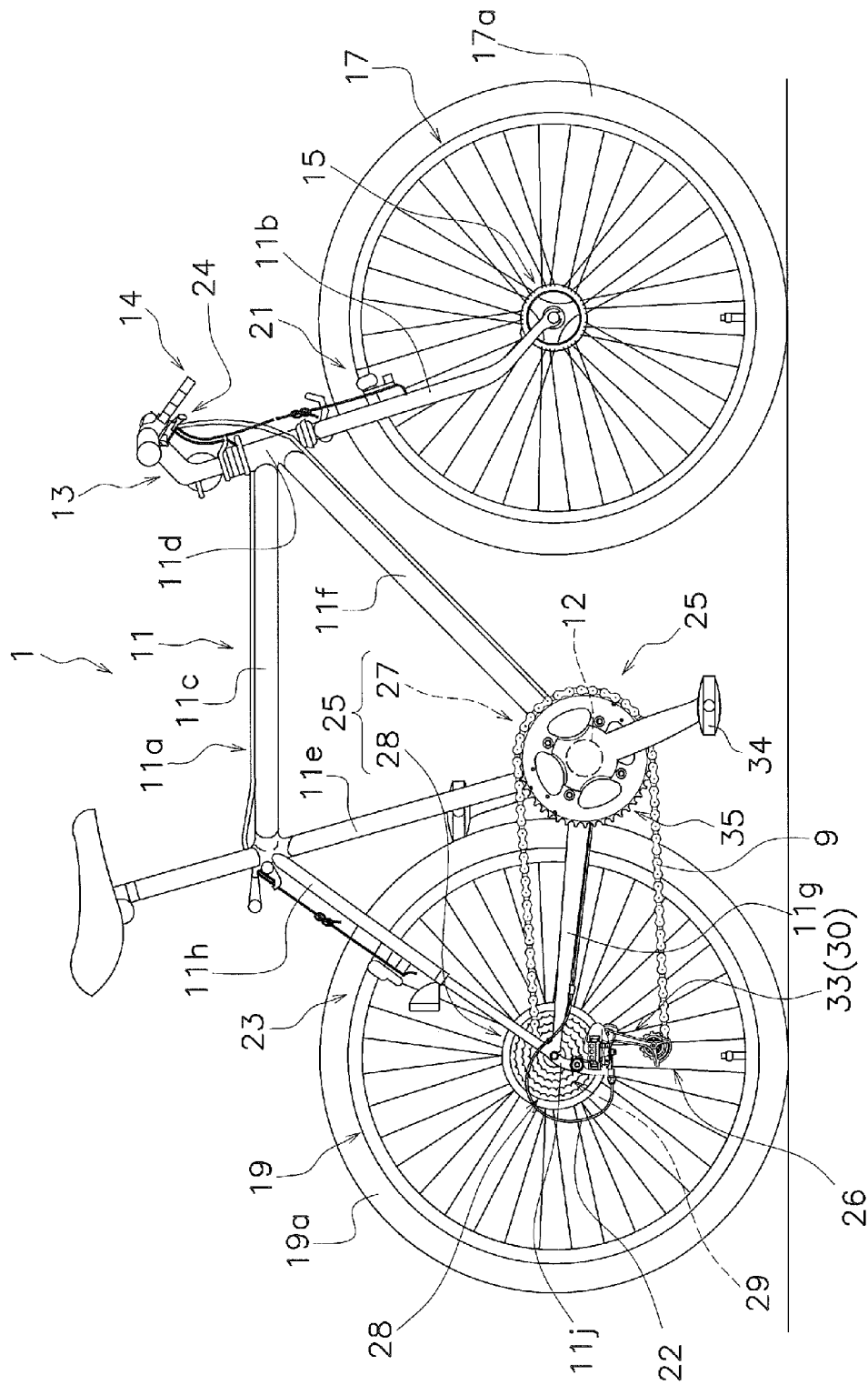
FIG. 1 is a side view of a bicycle according to an embodiment of the present invention.

As shown FIG. 1, a bicycle 1 includes a bicycle chain 9, a frame 11, a handle 13, a front hub assembly 15, front and rear wheels 17, 19, front and rear brake devices 21, 23, a shifting device 24, and a driving portion 25 (an example of a bicycle driving system).

The frame 11 includes a frame body 11a and a front fork 11b. The frame body 11a includes a top tube 11c, a head tube 11d, a seat tube 11e, a down tube 11f, a pair of chain stays 11g, a pair of seat stays 11h, and a bottom bracket hanger 12. A connection portion of the seat stay 11h and the chain stay 11g is described as a pair of rear ends 11j below.

The front fork 11b is rotatably attached to the head tube 11d of the frame body 11a. The handle 13 is fixed to the front fork 11b. The front hub assembly 15 is supported on the front fork 11b. The front wheel 17 is rotatably attached to the front fork 11b via the front hub assembly 15. The rear wheel 19 is rotatably attached to a rear portion of the frame 11 (the frame body 11a) via a rear hub assembly 29 (an example of a bicycle hub assembly). A front tire 17a is attached to the front wheel 17. A rear tire 19a is attached to the rear wheels 19.

The front and rear brake devices 21, 23 are operated by a brake operating device 14. The shifting device 24 is attached to the handle 13. The shifting device 24 operates a rear derailleur 26 via a control cable 22. The rear derailleur 26 moves the bicycle chain 9 from one rear sprocket of a rear sprocket assembly 28 to an adjacent rear sprocket of the rear sprocket assembly 28 by a shifting device 24 attaching to, e.g. the right side of the handle 13. The rear sprockets are shown by a simplified description in FIG. 1. The rear derailleur 26 is, for example, attached to a rear portion of the frame 11 (the frame body 11a).

<Configuration of the Driving Portion>

As shown in FIG. 1, the driving portion 25 mainly includes a crank assembly 27 and the rear sprocket assembly 28 (an example of a multiple rear sprocket assembly). Specifically, the driving portion 25 mainly includes a crank assembly 27, a rear sprocket assembly 28, and a rear hub assembly 29.

According to the present invention, the drive ratio remains greater than or equal to 0.74 and less than or equal to 3.40. The drive ratio is a drive ratio (or a gear ratio) between a front sprocket 35 (described as below) of the crank assembly 27 and one of rear sprockets of the rear sprocket assembly 28.

(Crank Assembly)

Figure 2:
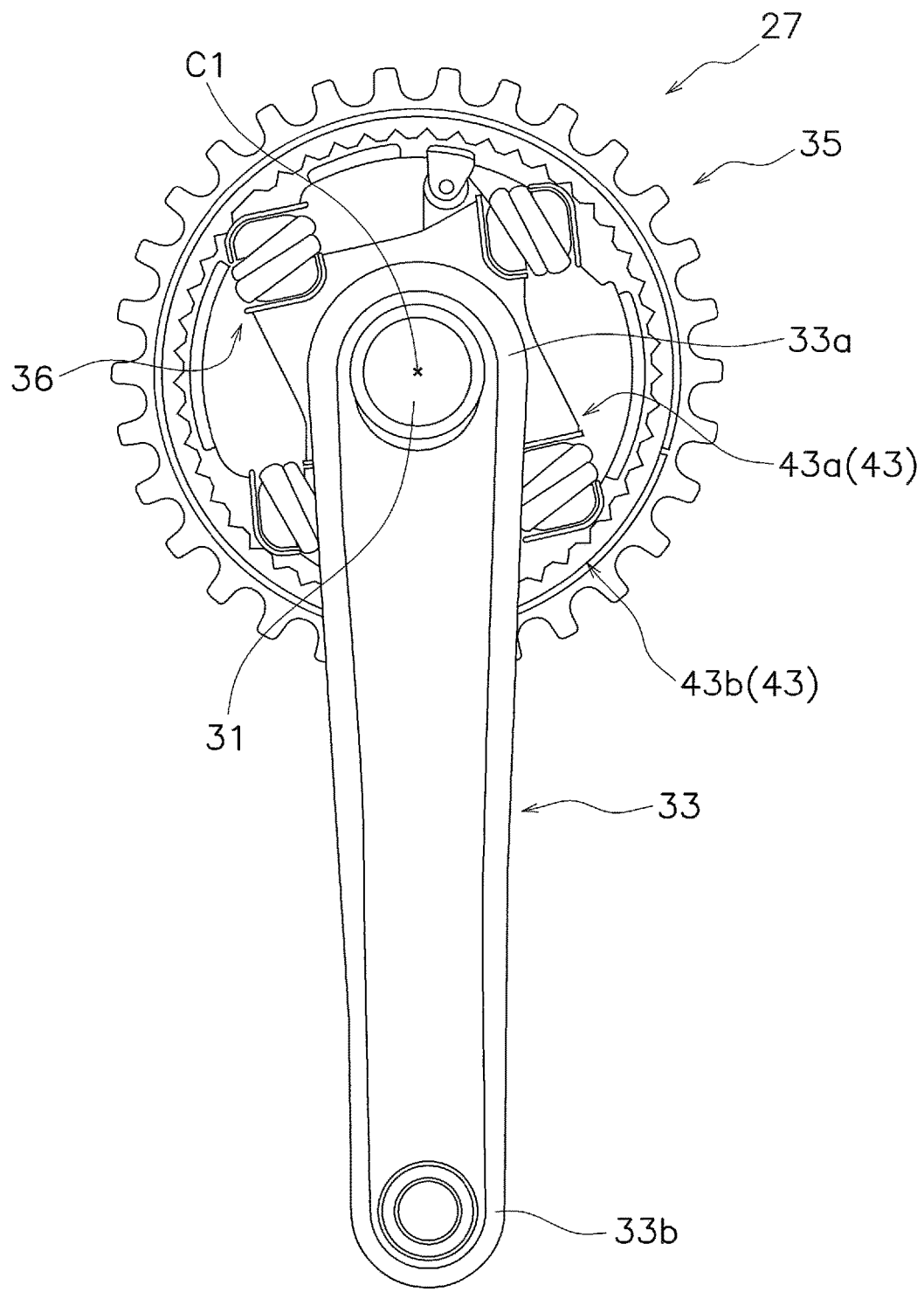
FIG. 2 is a side view of a crank assembly according to the embodiment.

As shown in FIG. 1, the crank assembly 27 is rotatably supported on a lower portion of the frame 11, for example, the bottom bracket hanger 12. As shown in FIG. 2, the crank assembly 27 mainly includes a crank axle 31, a right crank arm 33, a left crank arm (not shown), the front sprocket 35, and a sliding mechanism 36.

(Crank Axle and Crank Arm)

Figure 3:
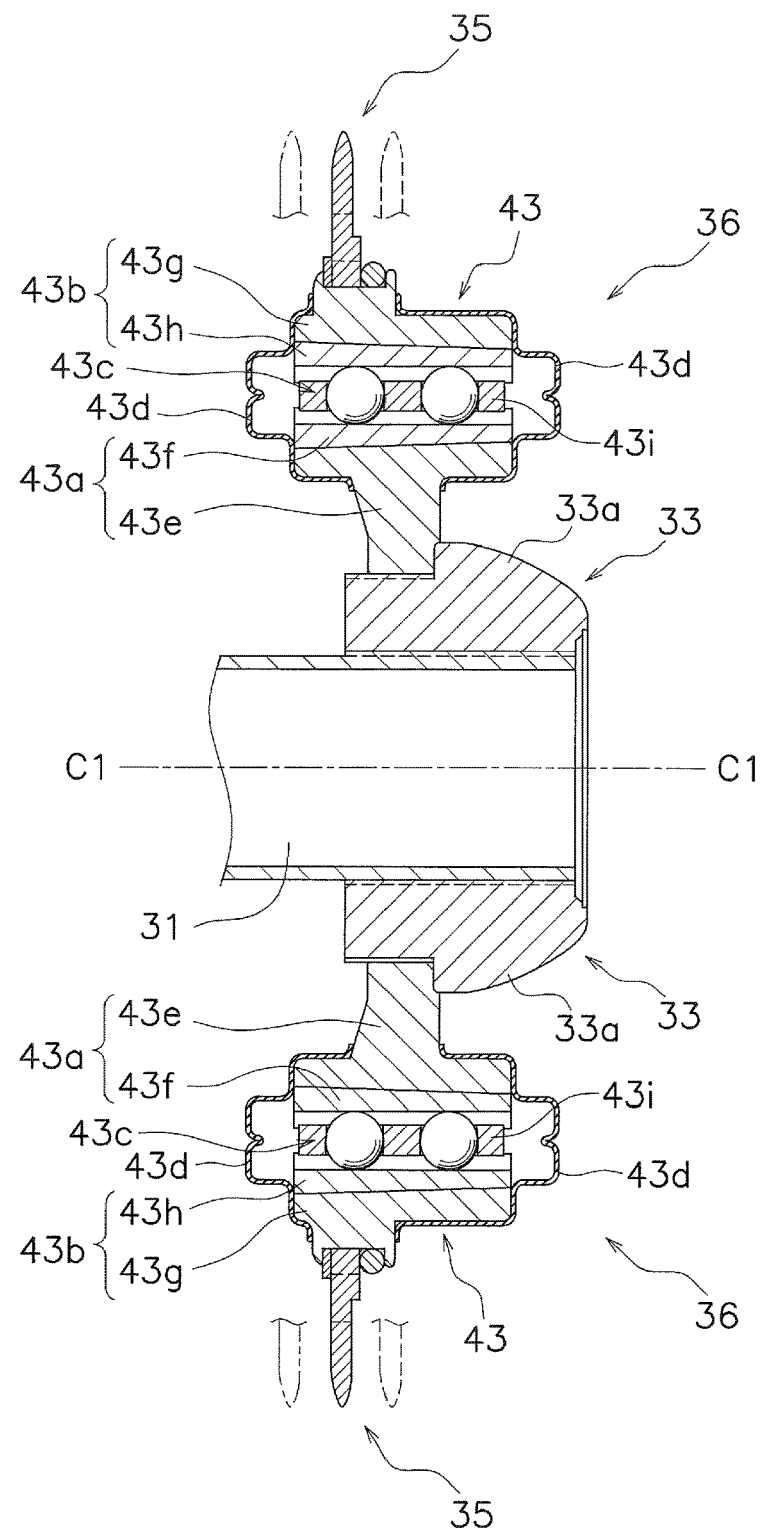
FIG. 3 is a partial sectional view of a crank assembly according to the embodiment.

As shown in FIG. 1, the crank axle 31 is rotatably supported on the bottom bracket hanger 12 via the bottom bracket assembly (not shown). As shown in FIGS. 2 and 3, the right crank arm 33 and the left crank arm (not shown) are mounted on the crank axle 31. As shown in FIG. 3, for example, a right crank axle mounting portion 33a of the right crank arm 33 is fixedly attached to one end of the crank axle 31 with a spline engagement. The right crank axle mounting portion 33a is provided on one end of the right crank arm 33.

A left crank axle mounting portion (not shown) of the left crank arm is fixedly attached to the other end of the crank axle 31 with a spline engagement and an axle bolt. The left crank axle mounting portion is provided on one end of the left crank arm.

As shown in FIG. 1, a pair of pedals 34 are attached to pedal axle mounting portions 33b (see FIG. 2) of the right crank arm 33 and the left crank arm respectively. The pedal axle mounting portions 33b is provide on the other ends of the right crank arm 33 and the left crank arm.

(Front Sprocket)

As shown in FIGS. 1 to 3, the front sprocket 35 is attached to the right crank arm 33 so as to be integrally rotatable with the right crank arm 33. The front sprocket 35 includes a rotational center axis C1, and is attached to the right crank arm 33 so as to be movable relative to the crank arm 33 in an axial direction parallel to the rotational center axis C1. The rotational center axis C1 of the front sprocket 35 corresponds to a rotational center axis of crank axle 31.

The front sprocket 35 is a solitary front sprocket in the embodiment. Alternatively, the driving portion 25 (an example of the bicycle driving system) may include two or three front sprockets. The front sprocket 35 is attached to the right crank arm 33 via the sliding mechanism 36. Specifically, the front sprocket 35 is attached to the sliding mechanism 36. The sliding mechanism 36 is attached to the right crank axle mounting portion 33a of the right crank arm 33.

During operation, the front sprocket 35 integrally rotates with both of the right crank arm 33 and the sliding mechanism 36. During operation, the sliding mechanism 36 allows the front sprocket 35 to move with respect to the crank arm 33 in the axial direction in accordance with the bicycle chain 9. In other words, during operation, the front sprocket 35 moves in the axial direction in accordance with tension of the bicycle chain 9 connecting the front sprocket 35 and one of the rear sprockets. The bicycle chain 9 is connected the front sprocket 35 and any one of eleven or more rear sprockets (described as below) of the rear sprocket assembly 28.

(Sliding Mechanism)

As shown in FIGS. 2 and 3, the sliding mechanism 36 includes a plurality of sliding portions 43, for example, four sliding portions 43. The plurality of sliding portions 43 are arranged at equal intervals in a circumferential direction with respect to the rotational center axis C1. Each of the plurality of sliding portions 43 is arranged between the front sprocket 35 and the right crank axle mounting portion 33a of the right crank arm 33 in a radial direction with respect to the rotational center axis C1. Thus, the circumferential direction and the radial direction is defined by based on rotational center axis C1 of the crank axle 31.

Each of the sliding portions 43 includes a first supporting portion 43a, a second supporting portion 43b, and at least one of rolling element 43c. The sliding portion 43 is covered by dust covers 43d.

The first supporting portion 43a is attached to the right crank arm 33. Specifically, the first supporting portion 43a includes a first mounting portion 43e and a first ball supporting portion 43f. The first mounting portion 43e is attached to the right crank axle mounting portion 33a of the right crank arm 33 and integrally rotate with the right crank arm 33. The first ball supporting portion 43f is attached to the first mounting portion 43e and integrally rotates with the first mounting portion 43e.

The second supporting portion 43b is attached to the front sprocket 35. Specifically, the second supporting portion 43b includes a second mounting portion 43g and a second ball supporting portion 43h. The front sprocket 35 is attached to the second mounting portion 43g and integrally rotate with the second mounting portion 43g. The second ball supporting portion 43h is attached to the second mounting portion 43g and integrally rotates with the second mounting portion 43g.

At least one rolling element 43c is, for example, two rolling elements. The two rolling elements 43c are disposed between the first supporting portion 43a and the second supporting portion 43b. The two rolling elements 43c allow the second supporting portion 43b to move with respect to the first supporting portion 43a in the axial direction. In other words, the front sprocket 35 moves with respect to the crank arm 33 in the axial direction via the sliding mechanism 36. The two rolling elements 43c are held by a holding portion 43i. The at least one rolling element 43c may also be more than two rolling elements.

Specifically, the bicycle chain 9 is looped between the front sprocket 35 and any one of the eleven or more rear sprockets of the rear sprocket assembly 28. The front sprocket 35 is pulled in the axial direction by the bicycle chain 9, in case that inclination of the bicycle chain 9 exceeds a predetermined angle when viewing from the upper side of the driving portion 25. Then the front sprocket 35 moves with respect to the crank arm 33 via the sliding mechanism 36. As a result of axial movement of the front sprocket 35 with respect to the crank arm 33 in accordance with the bicycle chain 9, an inclination angle of the bicycle chain 9 is reduced.

The inclination of the bicycle chain 9 is defined by an angle between the front sprocket 35 and a rear sprocket of the rear sprocket assembly, based on a plane perpendicular to the rotational center axis C1 of the crank axle 31 when viewing from the upper side of the driving portion 25.

(Rear Sprocket Assembly)

Figure 4:
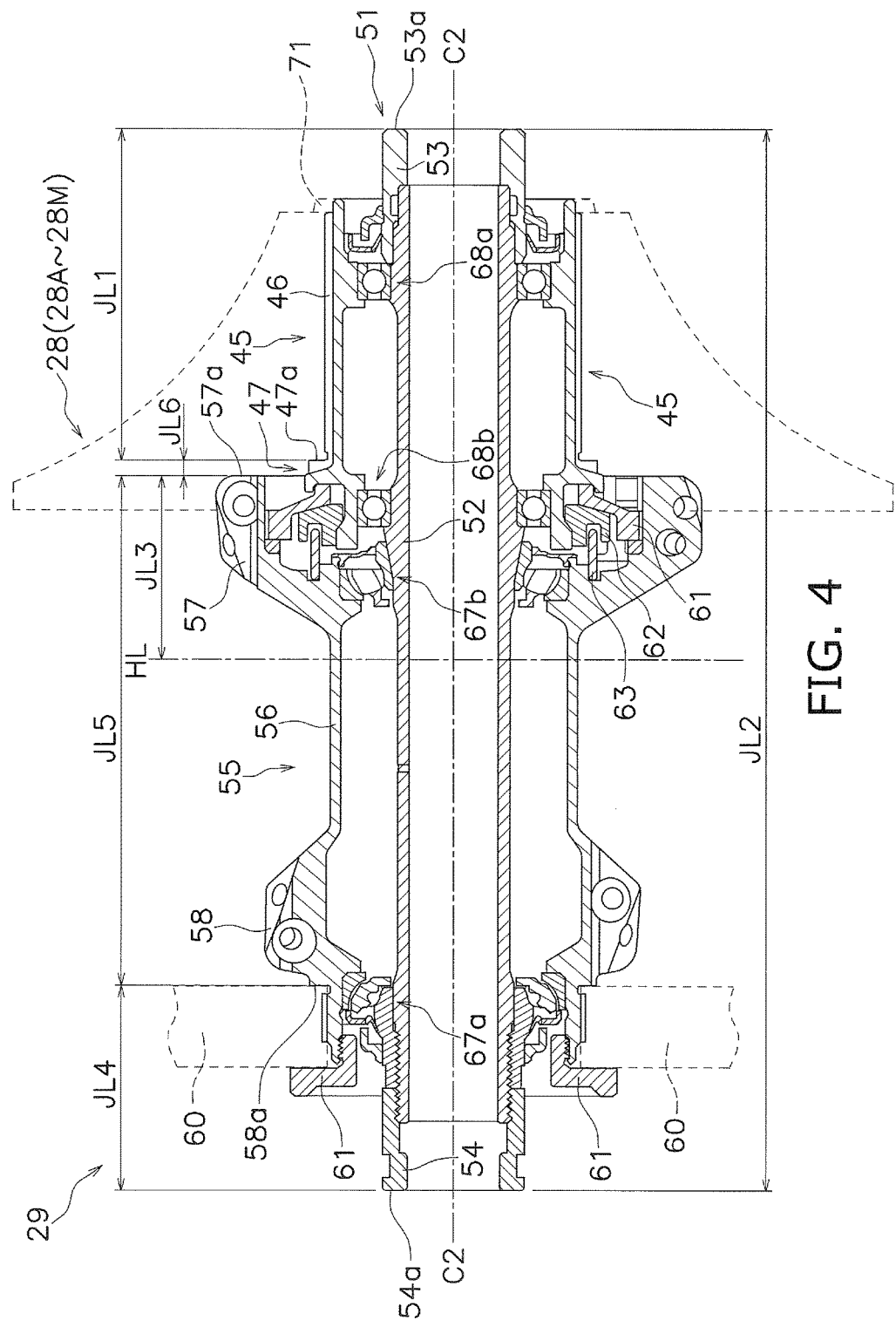
FIG. 4 is a sectional view of a rear hub assembly according to the embodiment.
Figure 5:
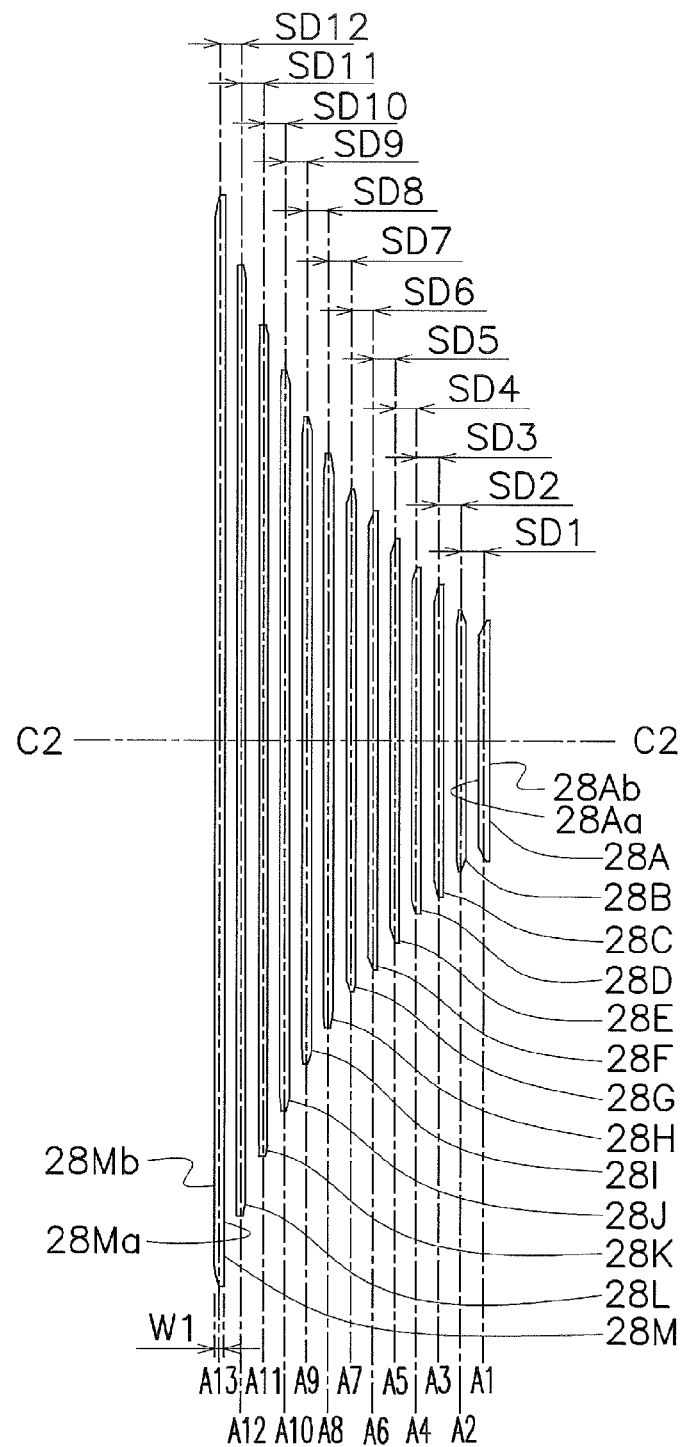
FIG. 5 is a rear view of a rear sprocket assembly according to the embodiment.
Figure 6:
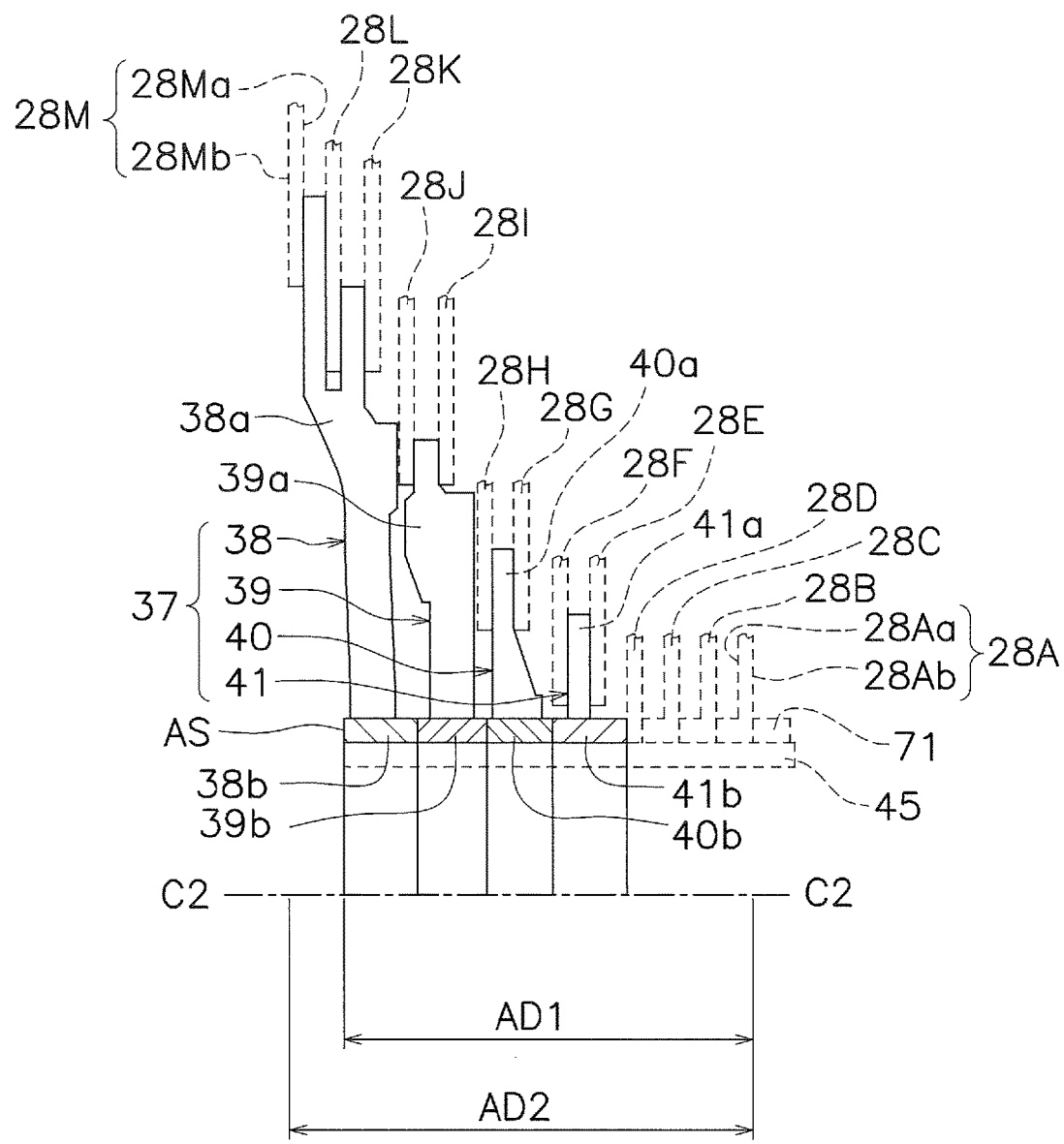
FIG. 6 is a sectional view of sprocket support members according to the embodiment.

As shown in FIGS. 4 to 6, the rear sprocket assembly 28 is supported by a sprocket mounting member 45 (as described below). The rear sprocket assembly 28 rotates with the sprocket mounting member 45. Specifically, the rear sprocket assembly 28 includes a rotational center axis C2. The rear sprocket assembly 28 rotates with the sprocket mounting member 45 around the rotational center axis C2. The rotational center axis C2 of the rear sprocket assembly 28 corresponds to a center axis of a rear hub axle 51.

The rear sprocket assembly 28 (an example of the multiple rear sprocket assembly) includes eleven or more rear sprockets. As shown in FIG. 5, for example, the rear sprocket assembly 28 includes thirteen rear sprockets 28A-28M. In other words, the rear sprocket assembly 28 includes a first to a thirteenth rear sprockets 28A-28M. The first rear sprocket 28A is an example of a smallest rear sprocket. The thirteenth rear sprocket 28M is an example of a largest rear sprocket. Any one of the first to thirteenth rear sprockets 28A-28M is configured to be connected to the front sprocket 35, particularly the solitary front sprocket 35, via a bicycle chain 9.

Specifically, the rear sprocket assembly 28 includes the first to thirteenth rear sprockets 28A-28M and a plurality of sprocket support members 37 (see FIG. 6). Any one of the first to thirteenth rear sprockets 28A-28M is configured to be connected to the front sprocket 35 via the bicycle chain 9. At least one of sprocket support members 37 is configured to support at least one of the first to thirteenth rear sprockets 28A-28M on the sprocket mounting member 45.

(Rear Sprockets)

As shown in FIGS. 4 and 5, the first to thirteenth rear sprocket 28A-28M are arranged side by side in order in the axial direction.

The first rear sprocket 28A is disposed on a side of the frame 11 (the frame body 11a). The thirteenth rear sprocket 28M is disposed on a side of a rear hub shell 55. The rear sprockets 28B-28L are disposed between the first rear sprocket 28A and the thirteenth rear sprocket 28M.

The first to fourth sprocket 28A-28D are directly engaged with the sprocket mounting member 45. For example, each of the rear sprockets 28A-28D is directly engaged with an outer peripheral surface of the sprocket mounting member 45 with a spline engagement.

The rear sprockets 28E-28M are engaged with the sprocket mounting member 45 via the plurality of the sprocket support members 37. For example, each of the plurality of sprocket support members 37 is directly engaged with an outer peripheral surface of the sprocket mounting member 45 with a spline engagement. In this state, the rear sprockets 28A-28M are retained on the sprocket mounting member 45 with a lock nut 71 (see FIG. 4) in an axial direction with respect to the rotational center axis C2.

In the above the first to thirteenth rear sprockets 28A-28M, an axial width W1 is set as follows. As shown in FIG. 5, each of the first to thirteenth sprockets 28A-28M includes the axial width W1 extending in the axial direction. The axial width W1 is an axial thickness of each of the first to thirteenth sprockets 28A-28M. The axial width W1 of each rear sprocket 28A-28M is greater than or equal to 1.50 mm and less than or equal to 1.70 mm. In the embodiment, each of the first and second axial widths W1 is 1.6 mm.

In the above the first to thirteenth rear sprockets 28A-28M, axial rear sprocket distances SD1-SD12 are set as follows. As shown in FIG. 5, each of the first to thirteenth sprockets 28A-28M includes an axial centerline perpendicular to the rotational center axis C2. Specifically, the first to thirteenth rear sprocket 28A-28M respectively includes first to thirteenth axial centerline A1-A13 perpendicular to the rotational center axis C2. In other words, each rear sprocket includes an axial centerline perpendicular to the rotational center axis C2.

Each of the axial rear sprocket distances SD1-SD12 is defined between the axial centerlines (adjacent axial centerlines A1-13) of adjacent rear sprockets among the first to thirteenth rear sprockets 28A-28M. Each of the axial rear sprocket distances SD1-12 is greater than or equal to 3.75 mm and less than or equal to 3.90 mm.

The first rear sprocket 28A includes a first axial centerline A1 perpendicular to the rotational center axis C2. The second rear sprocket 28B includes a second axial centerline A2 perpendicular to the rotational center axis C2. A first rear sprocket distance SD1 is defined between the first axial center line A1 and the second axial center line A2. The first rear sprocket distance SD1 is greater than or equal to 3.85 mm and less than or equal to 3.90 mm. In the embodiment, the first rear sprocket distance SD1 is 3.88 mm.

The third rear sprocket 28C includes a third axial centerline A3 perpendicular to the rotational center axis C2. A second rear sprocket distance SD2 is defined between the second axial center line A2 and the third axial center line A3. The second rear sprocket distance SD2 is greater than or equal to 3.75 mm and less than or equal to 3.80 mm. In the embodiment, the second rear sprocket distance SD2 is 3.78 mm.

The fourth rear sprocket 28D includes a fourth axial centerline A4 perpendicular to the rotational center axis C2.

A third rear sprocket distance SD3 is defined between the third axial center line A3 and the fourth axial center line A4. The third rear sprocket distance SD3 is greater than or equal to 3.75 mm and less than or equal to 3.80 mm. In the embodiment, the third rear sprocket distance SD3 is 3.78 mm.

Each of fourth to twelfth sprocket distances SD4-SD12 is defined between the axial centerlines A4-A13 of adjacent rear sprockets 28D-28M, as well as the first to third sprockets 28A-28C. Each of fourth to twelfth rear sprocket distance SD4-SD12 is greater than or equal to 2.15 mm and less than or equal to 2.20 mm. In the embodiment, the fourth to twelfth rear sprocket distance SD4-SD12 is 2.18 mm.

In the above the first to thirteenth rear sprockets 28A-28M, axial distances are set as follows. As shown in FIG. 5, the first rear sprocket 28A includes a larger sprocket facing surface 28Aa and an axially external surface 28Ab. The larger sprocket facing surface 28Aa faces the second sprocket 28B in an axial direction parallel to the rotational center axis C2. The axially external surface 28Ab is a surface which is opposite to the larger sprocket facing surface 28Aa in the axial direction.

The thirteenth sprocket 28M includes a smaller sprocket facing surface 28Ma and an axially internal surface 28Mb. The smaller sprocket facing surface 28Ma faces the twelfth sprocket 28L in the axial direction. The axially internal surface 28Mb is a surface which is opposite to the smaller sprocket facing surface 28Ma in the axial direction.

As shown in FIG. 6, the rear sprocket assembly 28 (i.e. the multiple sprocket assembly) includes an axial abutment surface AS that is configured to axially abut against the rear hub assembly 29 (i.e. the bicycle hub assembly) in a state where the rear sprocket assembly 28 is mounted to the rear hub assembly 29. A first axial distance AD1 is defined between the axially external surface 28Ab of the first rear sprocket 28A sprocket and an axial abutment surface AS of the rear sprocket assembly 28 (as described below, see FIG. 6). The first axial distance AD1 is larger than or equal to 41.0 mm and smaller than or equal to 42.0 mm in a state where the rear sprocket assembly 28 is mounted to the rear hub assembly 29. Specifically, the first axial distance AD1 is greater than or equal to 41.50 mm and less than or equal to 41.60 mm. In the embodiment, for example, the first axial distance AD1 is 41.58 mm. The sprocket mounting state is a state where the rear sprocket assembly 28 is mounted to the rear hub assembly.

A second axial distance AD2 is defined between the axially external surface 28Ab of the first rear sprocket 28A and the axially internal surface 28Mb of the thirteenth rear sprocket 28M. The second axial distance AD2 is larger than or equal to 47.00 mm and smaller than or equal to 48.00 mm in a state where the rear sprocket assembly 28 is mounted to the rear hub assembly 29. In the embodiment, the second axial distance AD2 is 47.16 mm.

In the above the first to thirteenth rear sprockets 28A-28M, tooth numbers are set as follows. The first rear sprocket 28A includes a first tooth number. The first rear sprocket 28A is a smallest rear sprocket of the first to thirteenth rear sprocket 28A-28M. The first tooth number is equal to or less than eleven. For example, the first tooth number is ten. The second rear sprocket 28B includes a second tooth number that is larger than the first tooth number. For example, the second tooth number is eleven. The third rear sprocket 28C includes a third tooth number that is larger than the second tooth number. For example, the third tooth number is thirteen.

The fourth rear sprocket 28D includes a fourth tooth number that is larger than the third tooth number. For example, the fourth tooth number is fifteen. The fifth rear sprocket 28E includes a fifth tooth number that is larger than the fourth tooth number. For example, the fifth tooth number is seventeen. The sixth rear sprocket 28F includes a sixth tooth number that is larger than the fifth tooth number. For example, the sixth tooth number is nineteen.

The seventh rear sprocket 28G includes a seventh tooth number that is larger than the sixth tooth number. For example, the seventh tooth number is twenty one. The eighth rear sprocket 28H includes an eighth tooth number that is larger than the seventh tooth number. For example, the eighth tooth number is twenty four. The ninth rear sprocket 28I includes a ninth tooth number that is larger than the eighth tooth number. For example, the ninth tooth number is twenty seven.

The tenth rear sprocket 28J includes a tenth tooth number that is larger than the ninth tooth number. For example, the tenth tooth number is thirty one. The eleventh rear sprocket 28K includes an eleventh tooth number that is larger than the tenth tooth number. For example, the eleventh tooth number is thirty five. The twelfth rear sprocket 28L includes a twelfth tooth number that is larger than the eleventh tooth number. For example, the twelfth tooth number is forty. The thirteenth rear sprocket 28M includes a thirteenth tooth number. The thirteenth rear sprocket 28M is largest rear sprocket of the first to thirteenth rear sprocket 28A-28M. The thirteenth rear sprocket 28M is larger than the twelfth tooth number. The thirteenth tooth number is equal to or more than thirty-five. For example, the thirteenth tooth number is forty-six.

(Sprocket Support Members)

The plurality of sprocket support members 37 support the rear sprockets 28E-28M and are mounted to the sprocket mounting member 45 respectively as above. As shown in FIG. 6, the plurality of sprocket support members 37 includes a first sprocket support member 38, a second sprocket support member 39, a third sprocket support member 40, and a fourth sprocket support member 41. The first to the fourth sprocket support members 38-41 are arranged side by side in order in the axial direction. Each of the first to fourth sprocket support members 38-41 includes a plurality of arm portions and a tubular portion.

The first sprocket support member 38 is disposed on the side of the rear hub shell 55. The first sprocket support member 38 is disposed between the rear hub shell 55 and the second sprocket support member 39 in the axial direction. For example, the rear sprockets 28K-28M is fixed to the arm portions 38a of the first sprocket support member 38 by fixing members, such as fasteners. The tubular portion 38b of the first sprocket support member 38 is disposed between the rear hub shell 55 and tubular portions 39b of the second sprocket support members 39 in the axial direction. The tubular portion 38b of the first sprocket support member 38 is mounted to the sprocket mounting member 45 via the splines.

The tubular portion of the first sprocket support member 38 is configured to axially abut against the rear hub assembly 29. Specifically, the tubular portion 38b of the first sprocket support member 38 includes an axial abutment surface AS. The axial abutment surface AS is configured to axially abut against the rear hub assembly 29 in a state where the rear sprocket assembly 28 is mounted to the rear hub assembly 29. The axial abutment surface AS is formed on an end portion of the tubular portion 38b of the first sprocket support member 38.

The second sprocket support member 39 is disposed between the first and third sprocket support members 38, 40 in the axial direction. For example, the rear sprockets 28I-28J is fixed to the arm portions 39a of the second sprocket support member 39 by fixing members, such as fasteners. The tubular portion 39b of the second sprocket support member 39 is disposed between the tubular portions 38b, 40b of the first and third sprocket support members 38, 40 in the axial direction. The tubular portion 39b of the second sprocket support member 39 is mounted to the sprocket mounting member 45 via the splines.

The third sprocket support member 40 is disposed between the second and fourth sprocket support members 39, 41 in the axial direction. For example, the rear sprockets 28G-28H is fixed to the arm portions 40a of the third sprocket support member 40 by fixing members, such as fasteners. The tubular portion 40b of the third sprocket support member 40 is disposed between the tubular portions 39b, 41b of the second and fourth sprocket support members 39, 41 in the axial direction. The tubular portion 40b of the third sprocket support member 40 is mounted to the sprocket mounting member 45 via the splines.

The fourth sprocket support member 41 is disposed between the third sprocket support member 40 and the fourth rear sprocket 28D in the axial direction. For example, the fifth to sixth rear sprockets 28E-28F are fixed to the arm portions 41a of the fourth sprocket support member 41 by fixing members, such as fasteners. The tubular portion 41b of the fourth sprocket support member 41 is disposed between the tubular portion 40b of the third sprocket support member 40 and the rear sprocket 28D in the axial direction. The tubular portion 41b of the fourth sprocket support member 41 is attached to the sprocket mounting member 45 via the splines.

(Rear Hub Assembly)

As shown in FIG. 1, the rear hub assembly 29 is mounted on the rear portion of the frame 11, for example, between the pair of rear ends 11j in the axial direction.

As shown in FIG. 4, the rear hub assembly 29 is configured to mount the rear sprocket assembly 28 thereto. The rear hub assembly 29 mainly includes the rear hub axle 51, a rear hub shell 55, and the sprocket mounting member 45. Also the rear hub assembly 29 includes the rotational center axis C2.

(Rear Hub Axle)

Both ends of the rear hub axle 51 are supported on the rear part of the frame 11, for example, the pair of the rear ends 11j of the frame body 11a (see FIG. 1). As shown in FIG. 4, the rear hub axle 51 includes a hub axle portion 52, and first and second abutting portions 53, 54. The hub axle portion 52 is formed in a substantially tubular shape.

The hub axle portion 52 rotatably supports the rear hub shell 55 via bearings 67a, 67b. The bearings 67a, 67b are mounted on an outer periphery surface of the hub axle portion 52 and rotatably support the rear hub shell 55. The hub axle portion 52 rotatably supports the sprocket mounting member 45 via bearings 68a, 68b. The bearings 68a, 68b are mounted on an outer periphery surface of the hub axle portion 52 and rotatably support the sprocket mounting member 45.

The first and second abutting portions 53, 54 are formed in a substantially tubular shape. The first and second abutting portions 53, 54 are attached to both end of the hub axle portion 52 respectively. For example, the first and second abutting portions 53, 54 are attached on outer periphery surfaces of both end of the hub axle portion 52 respectively. The first and second abutting portions 53, 54 respectively position the bearings 67a, 68a mounted on the both end side. For example, the first and second abutting portions 53, 54 respectively position inner rings of the bearings 67a, 68a.

The first abutting portion 53 is disposed between the sprocket mounting member 45 and the rear part of the frame 11 (one of the pair of the rear ends 11j). The first abutting portion 53 includes a first axial frame abutment surface 53a. The first axial frame abutment surface 53a is configured to abut against one of the pair of the rear ends 11j in an axial direction parallel to the rotational center axis C2 in a hub mounting state. The hub mounting state is a state where the rear hub assembly 29 is mounted to the frame 11.

The first axial frame abutment surface 53a is formed on one end of the rear hub axle 51 which is on the sprocket mounting member 45 side. For example, the first axial frame abutment surface 53a is formed on the first abutting portion 53. The first axial frame abutment surface 53a can also be directly formed on an end of the hub axle portion 52 if the rear hub axle 51 does not include the first and second abutting portions 53, 54. The first axial frame abutment surface 53a is positioned closer to the sprocket mounting member 45 than a second axial frame abutment surface 54a (as described below).

The second abutting portion 54 is disposed between the rear hub shell 55 and the rear part of the frame 11. The second abutting portions 54 includes a second axial frame abutment surface 54a. The second axial frame abutment surface 54a is configured to abut against the other of a pair of the rear ends 11j in the axial direction in a state where the rear hub assembly 29 is mounted to the frame 11.

The second axial frame abutment surface 54a is formed on the other end of the rear hub axle 51 which is on the opposite side of the sprocket mounting member 45. For example, the second axial frame abutment surface 54a is formed on the second abutting portion 54. The second axial frame abutment surface 54a can also be directly formed on an end of the hub axle portion 52 if the rear hub axle 51 does not include the first and second abutting portions 53, 54. The second axial frame abutment surface 54a is positioned closer to the hub shell 51 than the first axial frame abutment surface 53a.

In the above configuration, the rear hub axle 51 is mounted on the rear ends 11j with a wheel securing device (not shown). The wheel securing device is the substantially same as the conventional device.

For example, a shaft of a wheel securing device is inserted into a hollow portion of the rear hub axle portion 52 and through bores of the first and second abutting portion 53, 54. For example, one end of the shaft of the wheel securing device can be screwed into one of a pair of the rear ends 11j. A lever of the wheel securing device is attached to the other end of the shaft. The lever is arranged on the outside of the other of the pair of the rear ends 11j. The rear hub axle portion 52 and the first and second abutting portions 53, 54 are clamped between the pair of the rear ends 11j by operating the lever.

(Rear Hub Shell)

As shown in FIG. 6, the rear hub shell 55 is rotatably supported around the rear hub axle 51. For example, the rear hub shell 55 is rotatably mounted on the rear hub axle 51 (the hub axle portion 52) via bearings 67a, 67b.

A disc rotor 60 is attached to the rear hub shell 55. For example, the disc rotor 60 is disposed adjacent to a second hub flange 58 (as described below) and is fixed on the rear hub shell 55 by a lock ring 61.

The rear hub shell 55 includes hub shell body 56, and first and second hub flanges 57, 58. The hub shell body 56 is formed in a substantially tubular shape. The rear hub axle 51 is disposed in the hub shell body 56. The bearings 67a, 67b are disposed between the hub shell body 56 and the rear hub axle 51 in the radial direction. Thus the hub shell body 56 is rotatably supported on the hub axle 51 via bearings 67a, 67b.

The first and second hub flanges 57, 58 are arranged on the hub shell body 56 at an intervals in the axial direction. The first and second hub flanges 57, 58 protrude from the hub shell body 56 in the radial direction with respect to the rotational center axis C2 and are integrally formed on the hub shell body 56. The first and second hub flanges 57, 58 are respectively formed in a substantially annular shape from an axial view with respect to the rotational center axis C2. Spokes are attached to each of the first and second hub flanges 57, 58. In other words, the rear wheel 19 is attached to the first and second hub flanges 57, 58 via the spokes.

The first hub flange 57 includes an axially external surface 57a. The second hub flange 58 includes an axial disc-rotor abutment surface 58a.

The axially external surface 57a is provided on the first hub flange 57 on the one end side of the rear hub axle 51, for example, on the side of the sprocket mounting member 45. Specifically, the axially external surface 57a is formed on the first hub flange 57 on a plane substantially perpendicular to the rotational center axis C2. The axially external surface 57a faces to the rear sprocket assembly 28, for example, the plurality of sprocket support members 37 (see FIG. 6).

The axial disc-rotor abutment surface 58a is configured to abut against the disc rotor 56 in the axial direction in a state where the bicycle disc-rotor 60 is mounted to the rear hub assembly 29. The axial disc-rotor abutment surface 58a is provided on the second hub flange 58 on the other end side of the rear hub axle 51.

Specifically, the axial disc-rotor abutment surface 58a is formed on the second hub flange 58 on a plane substantially perpendicular to the rotational center axis C2. The axial disc-rotor abutment surface 58a faces to a side surface of the disc-rotor 60 and abut against the side surface of the disc-rotor 60.

(Sprocket Mounting Member)

As shown in FIG. 6, the sprocket mounting member 45 is rotatably supported on the rear hub axle 51. For example, the sprocket mounting member 45 is arranged on the outside of the rear hub axle 51 (the hub axle portion 52) in the radial direction with respect to the rotational center axis C2 and is mounted on the hub axle 51 via bearings 68a, 68b. Also, the sprocket mounting member 45 rotates integrally with the rear hub shell 55 around the rotational center axis C2 of the rear hub axle 51. A rotational center axis of the sprocket mounting member 45 corresponds to the rotational center axis C2 of the rear hub shell 55.

The sprocket mounting member 45 includes a sprocket mounting body 46 and a sprocket abutment portion 47. The sprocket mounting body 46 is formed in a substantially tubular shape. The rear hub axle 51 (the hub axle portion 52) is disposed in the sprocket mounting body 46. The bearing 68a, 68b is disposed between the sprocket mounting body 46 and the rear hub axle 51 in the radial direction. Thus the sprocket mounting body 46 is rotatably mounted on the hub axle 51 via bearings 68a, 68b.

The sprocket abutment portion 47 is configured to abut against the rear sprocket assembly 28. Specifically, the sprocket abutment portion 47 protrudes from the sprocket mounting body 46 in the radial direction and is integrally formed on the sprocket mounting body 46. The sprocket abutment portion 47 is formed in a substantially annular shape.

The sprocket abutment portion 47 includes an axial rear-sprocket abutment surface 47a. The axial rear-sprocket abutment surface 47a is configured to abut against the rear sprocket assembly 28 in the axial direction in a state where the rear sprocket assembly 28 is mounted to the rear hub assembly 29. More specifically, the axial rear-sprocket abutment surface 47a is formed on the sprocket abutment portion 47 on a plane substantially perpendicular to the rotational center axis C2. The axial rear-sprocket abutment surface 47a abuts against axial abutment surface AS of the first sprocket support member 38, for example, the axial abutment surface AS of the tubular portion 38b.

In the above configuration, the sprocket mounting member 45 is attached on the rear hub shell 55 via a first and second positioning portions 61, 62.

The first and second positioning portions 61, 62 are disposed between the sprocket mounting member 45 and the rear hub shell 55 in the radial direction.

The first positioning portion 61 is engaged with the sprocket mounting member 45 and the rear hub shell 55 so as to rotate integrally with the sprocket mounting member 45 and the rear hub shell 55. The second positioning portion 62 is engaged with the sprocket mounting member 45 and the first positioning portion 61 so as to rotate integrally with the sprocket mounting member 45 and the first positioning portion 61.

A sealing member 63 is disposed between the second positioning portion 62 and the rear hub shell 55. The sealing member 63 is formed in a tubular shape. The sealing member 63 prevents a foreign matter to invade in the rear hub shell 55.

In the above rear hub assembly 29, axial lengths are set as follows. An axial centerline HL is defined on the rear hub shell 55. The axial centerline HL is positioned between the first axial frame abutment surface 53a and the second axial frame abutment surface 54a. Specifically, the axial centerline HL passes a center point of the rotational center axis C2 between the first axial frame abutment surface 53a and the second axial frame abutment surface 54a and is perpendicular to the rotational center axis C2.

A first axial length JL1 is defined between the first axial frame abutment surface 53a and the axial rear-sprocket abutment surface 47a in the axial direction. In other words, the first axial length JL1 is a length between the first axial frame abutment surface 53a and the axial rear-sprocket abutment surface 47a in the axial direction. The first axial length JL1 is greater than or equal to 45.00 mm and less than or equal to 50.00 mm. In the embodiment, the first axial length JL1 is greater than or equal to 48.78 mm.

A second axial length JL2 is defined between the first axial frame abutment surface 53a and the second axial frame abutment surface 54a in the axial direction. In other words, the second axial length JL2 is a length between the first axial frame abutment surface 53a and the second axial frame abutment surface 54a in the axial direction. The second axial length JL2 is greater than or equal to 140.00 mm and less than or equal to 158.00 mm. In the embodiment, the second axial length JL2 is 142.00 mm.

A third axial length JL3 is defined between the axially external surface 57a and the axial centerline HL in the axial direction. In other words, the third axial length JL3 is a length between the axially external surface 57a and the axial centerline HL in the axial direction. The third axial length JL3 is greater than or equal to 19.00 mm and less than or equal to 29.00 mm. Preferably, the third axial length JL3 is 19.99 mm if the second axial length JL2 is 142.00 mm, the third axial length JL3 is 23.72 mm if the second axial length JL2 is 148.00 mm, and the third axial length JL3 is 28.17 mm if the second axial length JL2 is 157.00 mm.

A fourth axial length JL4 is defined between the axial disc-rotor abutment surface 58a and the second axial frame abutment surface 54a in the axial direction. In other words, the fourth axial length JL4 is a length between the axial disc-rotor abutment surface 58a and the second axial frame abutment surface 54a in the axial direction. The fourth axial length JL4 is greater than or equal to 27.00 mm and less than or equal to 28.00 mm. In the embodiment, the fourth axial length JL4 is 27.75 mm.

A fifth axial length JL5 is defined between the axially external surface 57a and the axial disc-rotor abutment surface 58a in the axial direction. In other words, the fifth axial length JL5 is a length between the axially external surface 57a and the axial disc-rotor abutment surface 58a in the axial direction. The fifth axial length JL5 is greater than or equal to 69.00 mm and less than or equal to 71.00 mm. Preferably, the fifth axial length JL5 is 63.23 mm if the second axial length JL2 is 142.00 mm, the fifth axial length JL5 is 69.97 mm if the second axial length JL2 is 148.00 mm, and the fifth axial length JL5 is 78.92 mm if the second axial length JL2 is 157.00 mm.

A sixth axial length JL6 is defined between the axial rear-sprocket abutment surface 47a and the axially external surface 57a in the axial direction. In other words, the sixth axial length JL6 is a length between the axial rear-sprocket abutment surface 47a and the axially external surface 57a in the axial direction. The sixth axial length JL6 is greater than or equal to 1.00 mm and equal to or less than 2.50 mm. Preferably, the sixth axial length JL6 is 2.23 mm if the second axial length JL2 is 142.00 mm, the sixth axial length JL6 is 1.50 mm if the second axial length JL2 is 148.00 mm, and the sixth axial length JL6 is 1.55 mm if the second axial length JL2 is 157.00 mm.

Other Embodiments (A) In the embodiment, explanation is performed as an example that the rear hub axle 51 includes the hub axle portion 52 and the abutting portions 53. Instead of this, the rear hub axle 51 can be formed as a unitary member. In this case, for example, the hub axle portion 52 and the abutting portions 53 is integrally formed. Also, positioning members are attached to the both ends of the rear hub axle 51 respectively. The inner rings of the bearings 67a, 68a is positioned by the positioning members.

(B) In the embodiment, explanation is performed as an example that the axial rear-sprocket abutment surface 47a abuts against the first sprocket support member 38. Instead of this, the axial rear-sprocket abutment surface 47a can abut against the rear sprocket assembly 28. In this case, for example, the rear sprocket assembly 28 is attached to the sprocket mounting member 45 via the splines without the plurality of sprocket support members 37.

(C) In the embodiment, explanation is performed as an example that the second axial length JL2 is 142.00 mm. Instead of this, the second axial length JL2 can be 148.00 mm or 157.00 mm.

(D) In the embodiment, explanation is performed as an example that the first to thirteenth rear sprockets 28A-28M are mounted on the sprocket mounting member 45. Instead of this, the rear hub assembly 29 can further include an expanding portion. The expanding portion is attached to the end of the sprocket mounting member 45 and is integrally rotate with the sprocket mounting member 45. In this case, the first rear sprocket 28A may be mounted on the expanding portion and the second to thirteenth rear sprockets 28B-28M may be mounted on the sprocket mounting member 45.

(E) In the embodiment, explanation is performed as an example that tooth numbers of the first to thirteenth rear sprockets 28A-28M is set in a range from ten to forty-six. Instead of this, tooth numbers of the first to thirteenth rear sprockets 28A-28M can be set in a range from ten to fifty. In this case, for example, the first tooth number is ten. The second tooth number is thirteen. The third tooth number is fifteen. The fourth tooth number is seventeen. The fifth tooth number is nineteen. The sixth tooth number is twenty one. The seventh tooth number is twenty four. The eighth tooth number is twenty seven. The ninth tooth number is thirty one. The tenth tooth number is thirty five. The eleventh tooth number is forty. The twelfth tooth number is forty five. The thirteenth tooth number is fifty. Alternatively, the first tooth number can be ten. The second tooth number can be eleven. The third tooth number can be thirteen. The fourth tooth number can be fifteen. The fifth tooth number can be seventeen. The sixth tooth number can be nineteen. The seventh tooth number can be twenty one. The eighth tooth number can be twenty four. The ninth tooth number can be twenty seven. The tenth tooth number can be thirty one. The eleventh tooth number can be thirty five. The twelfth tooth number can be forty two. The thirteenth tooth number can be fifty.

Figure 7A:
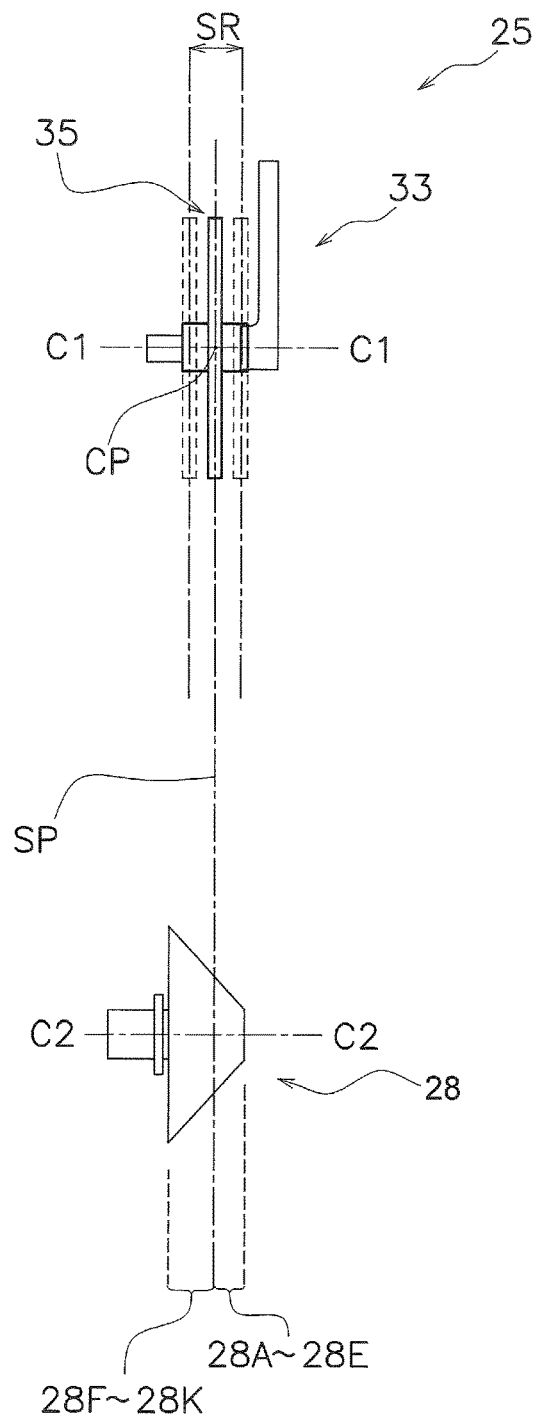
FIG. 7A is the positional relation of a front sprocket and eleven rear sprockets in a bicycle driving system according to the other embodiment.
Figure 7B:
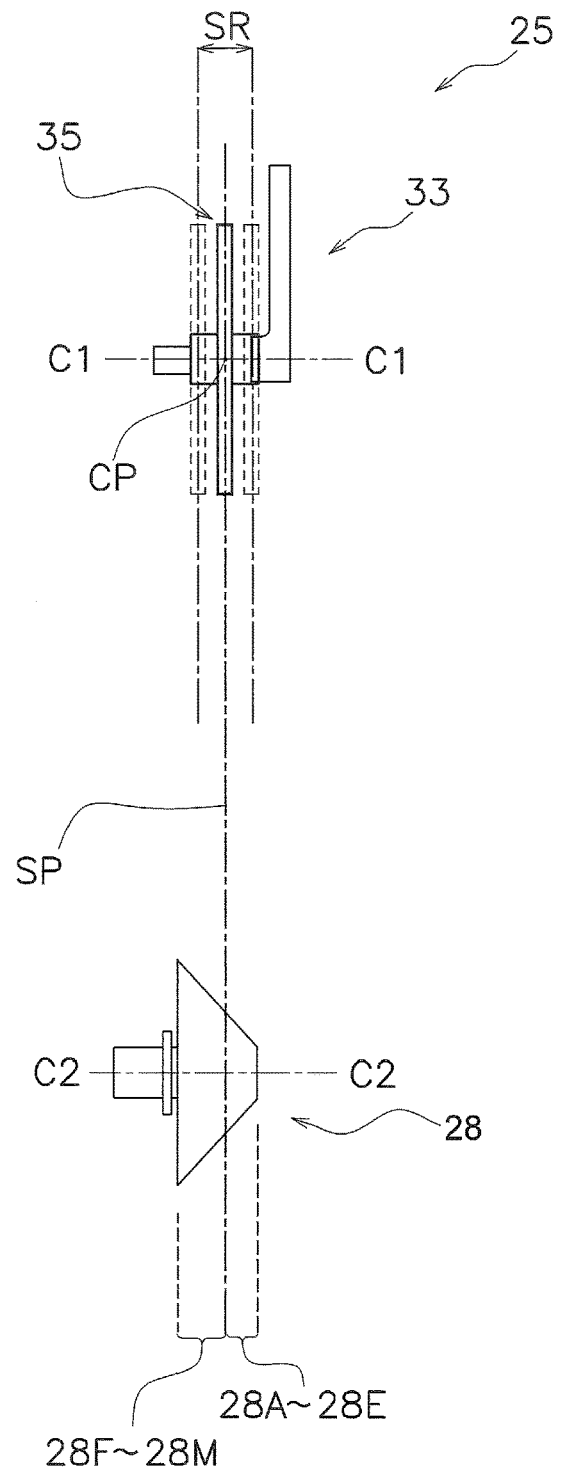
FIG. 7B is the positional relation of a front sprocket and thirteen rear sprockets in a bicycle driving system according to the other embodiment.

(F) It is preferable to configure the driving portion 25 (an example of the bicycle driving system) so that more than or equal to six rear sprockets among the rear sprocket assembly 28 are positioned axially inwardly from the front sprocket 35 in a state where the driving portion 25 is mounted to the bicycle 1 and where the front sprocket 35 is positioned at an axially center position CP in a sliding range SR of the sliding mechanism 36, as shown in FIGS. 7A and 7B.

Specifically, the bicycle driving system 25 further includes an axially center plane SP. The axially center plane SP is perpendicular to the rotational center axis C2 and passes through the axially center position CP in the sliding range SR. In other words, the axially center plane SP is coincident with the axially center position CP of the front sprocket 35. The front sprocket 35 moves in the sliding range SR in the axial direction. The more than or equal to six rear sprockets are positioned axially inwardly from the axially center plane SP.

For example, in the case that the total number of the rear sprockets 28 is more than or equal to eleven, as shown in FIG. 7A, it is preferable to configure the driving portion 25 so that more than or equal to six rear sprockets are positioned axially inwardly from the axially center plane SP in a state where the driving portion 25 is mounted to the bicycle 1. In the case that the total number of the rear sprockets 28 is more than or equal to thirteen, as shown in FIG. 7B, it is preferable to configure the driving portion 25 so that more than or equal to eight rear sprockets are positioned axially inwardly from the axially center plane SP in a state where the driving portion 25 is mounted to the bicycle 1.

FIG. 7A is an example in which the total number of the rear sprockets is eleven and six rear sprockets 28F-28K are positioned axially inwardly from the axially center plane SP in a state where the driving portion 25 is mounted to the bicycle 1. FIG. 7B is an example in which the total number of the rear sprockets is thirteen and eight rear sprockets 28F-28M are positioned axially inwardly from the axially center plane SP in a state where the driving portion 25 is mounted to the bicycle 1.

This results in low profile configuration of the rear sprocket assembly 28 because the rear sprocket assembly 28 does not too much protrude axially outwardly in a state where the driving portion 25 is mounted to the bicycle 1.

(G) Each of sprocket teeth of the front sprocket 35 may have an axially maximum chain engagement width that is smaller than an axially inner-link space defined by a pair of inner link plates of the bicycle chain 9 in which the pair of inner link plates face each other in an axial direction parallel to the rotational center axis C1 of the front sprocket 35 when the bicycle chain 9 engages with the front sprocket 35. Alternatively, sprocket teeth of the front sprocket 35 may also include first teeth each having a first axially maximum chain engagement width and second teeth each having second axially maximum chain engagement width that is smaller than the first axially maximum chain engagement width. The first axially maximum chain engagement width is larger than the axially inner-link space defined by the pair of inner link plates of the bicycle chain 9 and smaller than an axially outer-link space defined by a pair of outer link plates of the bicycle chain 9 in which the pair of outer link plates face each other in an axial direction parallel to the rotational center axis C1 of the front sprocket 35 when the bicycle chain 9 engages with the front sprocket 35. The second axially maximum chain engagement width is smaller than the axially inner-link space defined by a pair of inner link plates of the bicycle chain 9. Accordingly, the first teeth are configured to engage with a pair of outer link plates of the bicycle chain 9 in which the pair of outer link plates face each other in an axial direction parallel to the rotational center axis C1 of the front sprocket 35 when the bicycle chain 9 engages with the front sprocket 35, and the second teeth are configured to engage with a pair of inner link plates of the bicycle chain 9 in which the pair of inner link plates face each other in the axial direction. Preferably, the first teeth and the second teeth are alternately disposed on an outer periphery of the front sprocket 35.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below", "transverse", "inward" and "outward" as well as any other similar directional terms refer to those directions of the bicycle driving system and the multiple rear sprocket assembly in a state where the bicycle driving system and the multiple rear sprocket assembly are mounted to a bicycle. Accordingly, these terms, as utilized to describe the present technology should be interpreted relative to the bicycle driving system and the multiple rear sprocket assembly.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technologies are provided for illustration only, and not for the purpose of limiting the technology as defined by the appended claims and their equivalents.

What is claimed is:

1. A bicycle driving system comprising:
a crank assembly including a front sprocket and a crank arm, the front sprocket including a rotational center axis and being movable relative to the crank arm in an axial direction parallel to the rotational center axis;
a multiple rear sprocket assembly including eleven or more rear sprockets,
a tooth number of a smallest rear sprocket of the multiple rear sprocket assembly being equal to or less than eleven,
a tooth number of a largest rear sprocket of the multiple rear sprocket assembly is equal to or more than thirty-five; and
a hub assembly comprising:
a hub axle;
a hub body rotatably supported around the hub axle; and
a bicycle rear sprocket mounting member rotatably supported around the hub axle;
the bicycle hub assembly including:
a rotational center axis;
a first axial frame abutment surface configured to abut against a first part of a bicycle frame in an axial direction parallel to the rotational center axis in a state where the bicycle hub assembly is mounted to the bicycle frame;
a second axial frame abutment surface configured to abut against a second part of the bicycle frame in the axial direction in a state where the bicycle hub assembly is mounted to the bicycle frame; and
an axial rear-sprocket abutment surface configured to abut against the rear sprocket assembly in the axial direction in a state where the bicycle rear sprocket assembly is mounted to the bicycle hub assembly;
the first axial frame abutment surface being positioned closer to the bicycle rear sprocket mounting member than the second axial frame abutment surface; and
a first axial length defined between the first axial frame abutment surface and the axial rear-sprocket abutment surface in the axial direction being greater than or equal to 45.00 mm and less than or equal to 50.00 mm.

2. The bicycle driving system according to claim 1, wherein
the multiple rear sprocket assembly includes thirteen rear sprockets.

3. The bicycle driving system according to claim 1, wherein
a drive ratio between the front sprocket and the multiple rear sprocket assembly remains greater than or equal to 0.74 and less than or equal to 3.40.

4. The bicycle driving system according to claim 3, wherein
the front sprocket is a solitary front sprocket.

5. The bicycle driving system according to claim 1, wherein
during operation, the front sprocket moves in the axial direction in accordance with a bicycle chain connecting the front sprocket and one of the eleven or more rear sprockets.

6. The bicycle driving system according to claim 1, wherein
a tooth number of the smallest rear sprocket is ten; and
a tooth number of the largest rear sprocket is forty-six.

7. The bicycle driving system according to claim 1, wherein
more than or equal to six rear sprockets are positioned axially inwardly from the front sprocket in a state where the bicycle driving system is mounted to a bicycle and the front sprocket is positioned at an axially center position in a sliding range.

8. The bicycle driving system according to claim 7, wherein
more than or equal to eight rear sprockets are positioned axially inwardly from the front sprocket.

9. The bicycle driving system according to claim 1, further comprising:
an axially center plane perpendicular to the rotational center axis and passing through an axially center position in a range where the front sprocket moves in the axial direction, wherein
more than or equal to six rear sprockets are positioned axially inwardly from the axially center plane.

10. The bicycle driving system according to claim 9, wherein
more than or equal to eight rear sprockets are positioned axially inwardly from the axially center plane.

11. A bicycle driving system comprising:
a multiple rear sprocket assembly includes a rotational center axis and comprising:
a first rear sprocket including a first tooth number;
a second rear sprocket including a second tooth number that is larger than the first tooth number;
a third rear sprocket including a third tooth number that is larger than the second tooth number;
a fourth rear sprocket including a fourth tooth number that is larger than the third tooth number;
a fifth rear sprocket including a fifth tooth number that is larger than the fourth tooth number;

a sixth rear sprocket including a sixth tooth number that is larger than the fifth tooth number;
a seventh rear sprocket including a seventh tooth number that is larger than the sixth tooth number;
an eighth rear sprocket including an eighth tooth number that is larger than the seventh tooth number;
a ninth rear sprocket including a ninth tooth number that is larger than the eighth tooth number;
a tenth rear sprocket including a tenth tooth number that is larger than the ninth tooth number;
an eleventh rear sprocket including an eleventh tooth number that is larger than the tenth tooth number;
a twelfth rear sprocket including a twelfth tooth number that is larger than the eleventh tooth number; and
a thirteenth rear sprocket including a thirteenth tooth number that is larger than the twelfth tooth number; wherein
the first rear sprocket includes a larger sprocket facing surface that faces the second sprocket in an axial direction parallel to the rotational center axis and an axially external surface opposite to the larger sprocket facing surface in the axial direction;
the multiple sprocket assembly includes an axial abutment surface that is configured to axially abut against a bicycle hub assembly in a state where the multiple rear sprocket assembly is mounted to the bicycle hub assembly; and
a first axial distance defined between the axially external surface of the first sprocket and the axial abutment surface is larger than or equal to 41.0 mm and smaller than or equal to 42.0 mm in a state where the multiple sprocket assembly is mounted to the bicycle hub assembly; and
a hub assembly comprising:
a hub axle;
a hub body rotatably supported around the hub axle; and
a bicycle rear sprocket mounting member rotatably supported around the hub axle;
the bicycle hub assembly including:
a rotational center axis;
a first axial frame abutment surface configured to abut against a first part of a bicycle frame in an axial direction parallel to the rotational center axis in a state where the bicycle hub assembly is mounted to the bicycle frame;
a second axial frame abutment surface configured to abut against a second part of the bicycle frame in the axial direction in a state where the bicycle hub assembly is mounted to the bicycle frame; and
an axial rear-sprocket abutment surface configured to abut against the rear sprocket assembly in the axial direction in a state where the bicycle rear sprocket assembly is mounted to the bicycle hub assembly;
the first axial frame abutment surface being positioned closer to the bicycle rear sprocket mounting member than the second axial frame abutment surface; and
a first axial length defined between the first axial frame abutment surface and the axial rear-sprocket abutment surface in the axial direction being greater than or equal to 45.00 mm and less than or equal to 50.00 mm.

12. The bicycle driving system of claim 11, wherein the first axial distance is greater than or equal to 41.50 mm and less than or equal to 41.60 mm.

13. The bicycle driving system according to claim 11, wherein
the thirteenth sprocket includes a smaller sprocket facing surface that faces the twelfth sprocket in the axial direction and an axially internal surface opposite to the smaller sprocket facing surface in the axial direction; and
a second axial distance defined between the axially external surface of the first sprocket and the axially internal surface of the thirteenth sprocket is larger than or equal to 47.00 mm and smaller than or equal to 48.00 mm in a state where the multiple sprocket assembly is mounted to the bicycle hub assembly.

14. The bicycle driving system of claim 11, further comprising:
any one of the first to thirteenth rear sprockets is configured to be connected to a solitary front sprocket via a bicycle chain.

15. The bicycle driving system of claim 11, wherein
a tooth number of the first rear sprocket is equal to or less than eleven; and
a tooth number of the thirteenth rear sprocket is equal to or more than thirty-five.

16. The bicycle driving system of claim 15, wherein
a tooth number of the first rear sprocket is ten; and
a tooth number of the thirteenth rear sprocket is forty-six.

17. The bicycle driving system of claim 11, wherein
each rear sprocket includes an axial centerline perpendicular to the rotational center axis; and
an axial rear sprocket distance defined between axial centerlines of adjacent rear sprockets is greater than or equal to 3.75 mm and less than or equal to 3.90 mm.

18. The bicycle driving system of claim 11, wherein
the first rear sprocket includes a first axial centerline perpendicular to the rotational center axis;
the second rear sprocket includes a second axial centerline perpendicular to the rotational center axis;
the third rear sprocket includes a third axial centerline perpendicular to the rotational center axis;
a first rear sprocket distance defined between the first axial center line and the second axial center line is greater than or equal to 3.85 mm and less than or equal to 3.90 mm; and
a second rear sprocket distance defined between the second axial center line and the third axial center line is greater than or equal to 3.75 mm and less than or equal to 3.80 mm.

19. The bicycle driving system of claim 11, wherein
each rear sprocket includes an axial width extending in the axial direction; and
the axial width of each rear sprocket is greater than or equal to 1.50 mm and less than or equal to 1.70 mm.

* * * * *